United States Patent
Sengoku et al.

(10) Patent No.: US 9,976,196 B2
(45) Date of Patent: May 22, 2018

(54) HOT-STAMPED STEEL

(71) Applicant: NIPPON STEEL & SUMITOMO METAL CORPORATION, Tokyo (JP)

(72) Inventors: Akihiro Sengoku, Sodegaura (JP); Hiroshi Takebayashi, Tokai (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days. days.

(21) Appl. No.: 15/129,775

(22) PCT Filed: Mar. 31, 2015

(86) PCT No.: PCT/JP2015/060185
§ 371 (c)(1),
(2) Date: Sep. 27, 2016

(87) PCT Pub. No.: WO2015/152263
PCT Pub. Date: Oct. 8, 2015

(65) Prior Publication Data
US 2017/0145533 A1    May 25, 2017

(30) Foreign Application Priority Data
Mar. 31, 2014  (JP) .................. 2014-073811

(51) Int. Cl.
*C23C 2/06* (2006.01)
*C23C 2/28* (2006.01)
(Continued)

(52) U.S. Cl.
CPC .............. *C21D 9/46* (2013.01); *B32B 15/013* (2013.01); *C21D 1/18* (2013.01); *C21D 1/673* (2013.01);
(Continued)

(58) Field of Classification Search
CPC .... C23C 2/28; C23C 2/06; C23C 2/40; C23C 2/00; C23C 2/285; C23C 28/021;
(Continued)

(56) References Cited

U.S. PATENT DOCUMENTS

2006/0219334 A1   10/2006 Brodt et al.
2012/0164472 A1   6/2012 Kuhn et al.
(Continued)

FOREIGN PATENT DOCUMENTS

JP    2003-73774 A    3/2003
JP    2003-126921 A   5/2003
(Continued)

OTHER PUBLICATIONS

International Search Report for PCT/JP2015/060185 dated Jun. 30, 2015.
(Continued)

*Primary Examiner* — Michael E. La Villa
(74) *Attorney, Agent, or Firm* — Birch, Stewart, Kolasch & Birch, LLP

(57) ABSTRACT

Hot-stamped steel includes: a steel base metal including a tempered portion having hardness corresponding to 85% or less of the highest quenching hardness defined as a Vickers hardness at a depth position spaced away from a surface layer by ¼ times a sheet thickness in a case of performing water quenching after heating at a temperature equal to or higher than an $A_{c3}$ point and retention for 30 minutes; and a Zn coating layer formed on the tempered portion of the base metal. The Zn coating layer includes a solid-solution layer including a solid-solution phase containing Fe and Zn that is solid-soluted in Fe, and a lamella layer including solid-solution phase and a capital gamma phase. In the Zn coating layer, an area ratio of the lamella layer is 30 to 100% and an area ratio of the solid-solution layer is 0 to 70%.

6 Claims, 7 Drawing Sheets

(51) Int. Cl.

| | | |
|---|---|---|
| C23C 2/40 | (2006.01) | |
| C22C 38/54 | (2006.01) | |
| C22C 38/50 | (2006.01) | |
| C22C 38/32 | (2006.01) | |
| C22C 38/28 | (2006.01) | |
| C22C 38/26 | (2006.01) | |
| C22C 38/22 | (2006.01) | |
| C22C 38/06 | (2006.01) | |
| C22C 38/04 | (2006.01) | |
| C22C 38/02 | (2006.01) | |
| C22C 38/00 | (2006.01) | |
| B32B 15/01 | (2006.01) | |
| C21D 9/46 | (2006.01) | |
| C21D 1/18 | (2006.01) | |
| C25D 3/22 | (2006.01) | |
| C25D 7/00 | (2006.01) | |
| C23C 30/00 | (2006.01) | |
| C22C 18/00 | (2006.01) | |
| C21D 1/673 | (2006.01) | |
| C22C 38/44 | (2006.01) | |
| C22C 38/48 | (2006.01) | |
| C21D 9/00 | (2006.01) | |

(52) U.S. Cl.
CPC ............. *C22C 18/00* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/26* (2013.01); *C22C 38/28* (2013.01); *C22C 38/32* (2013.01); *C22C 38/44* (2013.01); *C22C 38/48* (2013.01); *C22C 38/50* (2013.01); *C22C 38/54* (2013.01); *C23C 2/06* (2013.01); *C23C 2/28* (2013.01); *C23C 2/40* (2013.01); *C23C 30/00* (2013.01); *C23C 30/005* (2013.01); *C25D 3/22* (2013.01); *C25D 7/00* (2013.01); *C21D 9/00* (2013.01); *C21D 2221/10* (2013.01); *Y10T 428/12792* (2015.01); *Y10T 428/12799* (2015.01); *Y10T 428/12958* (2015.01); *Y10T 428/12972* (2015.01); *Y10T 428/12979* (2015.01); *Y10T 428/12993* (2015.01); *Y10T 428/2495* (2015.01); *Y10T 428/24942* (2015.01); *Y10T 428/24983* (2015.01)

(58) Field of Classification Search
CPC ..... C23C 28/023; C23C 28/025; C23C 30/00; C23C 30/005; C22C 18/00; C22C 38/58; C22C 38/00; C22C 38/50; C22C 38/32; C22C 38/28; C22C 38/26; C22C 38/22; C22C 38/06; C22C 38/04; C22C 38/02; C22C 38/001; C22C 38/002; C22C 38/54; C22C 38/44; C22C 38/48; Y10T 428/12792; Y10T 428/12799; Y10T 428/12958; Y10T 428/12972; Y10T 428/12979; Y10T 428/12993; Y10T 428/24942; Y10T 428/2495; Y10T 428/24983; B32B 15/011; B32B 15/04; B32B 15/043; B32B 15/18; B32B 15/013; C21D 1/673; C21D 2221/10
See application file for complete search history.

(56) References Cited

U.S. PATENT DOCUMENTS

| | | | |
|---|---|---|---|
| 2012/0273092 A1 | 11/2012 | Ratte | |
| 2012/0325377 A1* | 12/2012 | Imai | .......................... C23C 2/26 148/284 |
| 2013/0048161 A1 | 2/2013 | Matsuda et al. | |
| 2013/0295402 A1 | 11/2013 | Oh et al. | |
| 2014/0255725 A1* | 9/2014 | Yamanaka | ................ B21B 3/00 428/659 |

FOREIGN PATENT DOCUMENTS

| | | |
|---|---|---|
| JP | 2003-129209 A | 5/2003 |
| JP | 2006-265706 A | 10/2006 |
| JP | 2007-500782 A | 1/2007 |
| JP | 2007-56307 A | 3/2007 |
| JP | 2011-173166 A | 9/2011 |
| JP | 2012-530847 A | 12/2012 |
| JP | 2013-244507 A | 12/2013 |
| RU | 2496887 C1 | 10/2013 |
| WO | 2011/111333 A1 | 9/2011 |
| WO | WO 2012/091328 A2 | 7/2012 |

OTHER PUBLICATIONS

Written Opinion of the International Searching Authority for PCT/JP2015/060185 (PCT/ISA/237) dated Jun. 30, 2015.
Extended European Search Report for counterpart European Application No. 15774478.0, dated Sep. 6, 2017.
Japanese Notice of Allowance and English translation for counterpart Japanese Application No. 2016-511945, dated Jan. 9, 2018.
Russian Office Action and Search Report for counterpart Russian Application No. 2016140280, dated Dec. 19, 2017, with an English translation.

* cited by examiner

HOT-STAMPED STEEL

TECHNICAL FIELD OF THE INVENTION

The present invention relates to hot-stamped steel.

Priority is claimed on Japanese Patent Application No. 2014-073811, filed on Mar. 31, 2014, the content of which is incorporated herein by reference.

RELATED ART

To realize high strength in a structural component used in automobiles, a structural component, which is produced through hot-stamping, may be used. The hot-stamping is a method in which a steel sheet, which is heated to an $A_{C3}$ point or higher, is rapidly cooled down by using a die while pressing the steel using the die. That is, in the hot-stamping, pressing and quenching are simultaneously performed. According to the hot-stamping, it is possible to produce a structural component having high shape accuracy and high strength. The steel (hot-stamped steel), which is produced by a producing method including the hot-stamping, is disclosed, for example, in Patent Document 1, Patent Document 2, and Patent Document 3. The hot-stamped steel, which is disclosed in the Patent Documents, is steel that is produced by performing hot-stamping with respect to a steel sheet coated with a galvanized layer so as to increase corrosion resistance.

As described above, in the hot-stamping, quenching is performed simultaneously with pressing. In addition, the hot-stamping is suitable to produce a structural component having high shape accuracy and high strength. According to this, typically, the strength (tensile strength) of the hot-stamped steel is approximately 1500 MPa or greater. However, recently, the demand for collision safety in automobiles has increased, and thus a component for automobiles may be required to have impact absorption properties in collision rather than the strength. Typically a material having low strength is preferable so as to increase the impact absorption properties. In the hot-stamped steel, it is known that the strength can be changed to a certain degree by changing the amount of alloy elements in the steel sheet or hot-stamping conditions. However, in a hot-stamping process, it is not preferable to change the hot-stamping conditions in accordance with a component when considering that an increase in pressing load may be caused. According to this, there is a demand for hot-stamped steel that has the same chemical composition as that of hot-stamped steel in which the strength of approximately 1500 MPa or greater is obtained through quenching in the hot-stamping, has corrosion resistance that is equal to or higher than the related art, and has a strength of approximately 600 MPa to 1450 MPa.

However, a method of reducing the strength of the hot-stamped steel without decreasing the corrosion resistance is not disclosed in Patent Document 1 to Patent Document 3.

In addition, a surface of hot-stamped steel, which is applied to a component for automobiles, may be frequently subjected to painting. During the painting, surfaces with high chemical convertibility have high film adhesiveness. Accordingly, in the hot-stamped steel, it is preferable that phosphate film which is formed by phosphate treatment is likely to adhere (that is, phosphate treatability is high).

In general, it is known that phosphate treatability deteriorates when hot stamping is performed with respect to steel (galvanized steel) having a galvanized layer. A technique which can increase the phosphate treatability of the hot-stamped steel which has a Zn coating layer has not been reported.

Accordingly, hot-stamping steel, which has a Zn coating layer and has the same chemical composition in the related art and excellent phosphate treatability, has not been provided.

PRIOR ART DOCUMENT

Patent Document

[Patent Document 1] Japanese Unexamined Patent Application, First Publication No. 2003-73774

[Patent Document 2] Japanese Unexamined Patent Application, First Publication No. 2003-129209

[Patent Document 3] Japanese Unexamined Patent Application, First Publication No. 2003-126921

DISCLOSURE OF THE INVENTION

Problems to be Solved by the Invention

The present invention has been made in consideration of the above-described problem. An object of the present invention is to provide hot-stamped steel that has impact absorption properties higher than those of hot-stamped steel having the same chemical composition in the related art, and includes a Zn coating layer excellent in phosphate treatability.

Means for Solving the Problem

The gist of the present invention is as follows.

(1) According to an aspect of the present invention, hot-stamped steel includes: a base metal that is a steel including a tempered portion having a hardness corresponding to 85% or less of the highest quenching hardness, the highest quenching hardness being defined as a Vickers hardness at a depth position spaced away from a surface layer by ¼ times a sheet thickness in a case of performing water quenching after heating to a temperature equal to or higher than an $A_{c3}$ point and retaining for 30 minutes; and a Zn coating layer that is formed on the tempered portion of the base metal, wherein the Zn coating layer includes a solid-solution layer including a solid-solution phase that contains Fe and Zn that is solid-soluted in Fe, and a lamella layer that includes the solid-solution phase and a capital gamma phase, and wherein in the Zn coating layer, an area ratio of the lamella layer in the Zn coating layer is 30 to 100% and an area ratio of the solid-solution layer is 0 to 70%.

(2) In the hot-stamped steel according to (1), the area ratio of the lamella layer in the Zn coating layer may be 80% or more.

(3) In the hot-stamped steel according to (1) or (2), a Vickers hardness of the tempered portion may be 180 Hv to 450 Hv.

(4) In the hot-stamped steel according to any one of (1) to (3), a hardness of the tempered portion may be 65% or less of the highest quenching hardness.

(5) In the hot-stamped steel according to any one of (1) to (4), the hot-stamped steel may be produced by heating to the $A_{c3}$ point or higher, working and quenching simultaneously through pressing by using a die, and then tempering at 500° C. or more and less than 700° C.

(6) In the hot-stamped steel according to any one of (1) to (5), a part of the base metal may be the tempered portion.

Effects of the Invention

According to the aspect of the present invention, it is possible to provide a hot-stamped steel having strength lower than that of hot-stamped steel having the same chemical composition in the related art, and including a Zn coating layer excellent in phosphate treatability.

EMBODIMENTS OF THE INVENTION

Figure 1:
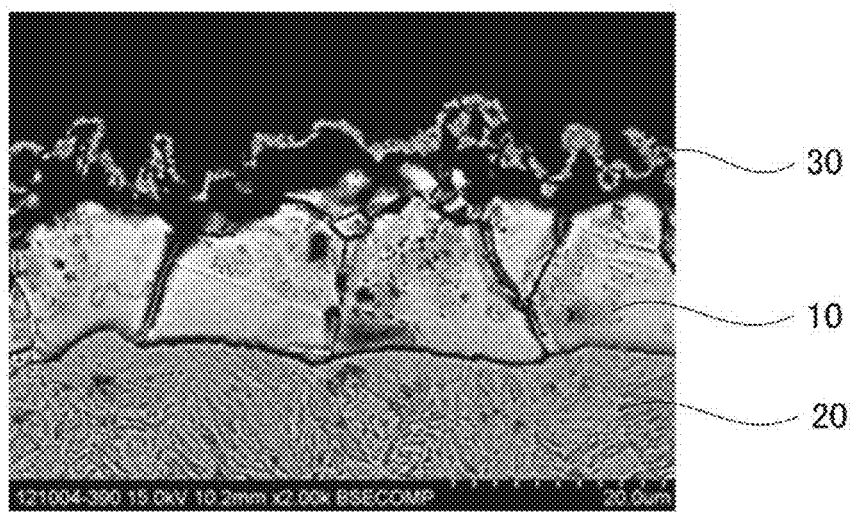
FIG. 1 is a cross-sectional SEM image of a Zn coating layer and the periphery thereof in a case where hot-stamped steel including the galvanized layer is tempered at 400° C.

The present inventor studied regarding a method for increasing impact absorption properties and phosphate treatability of hot-stamped steel including a Zn coating layer. As a result, the present inventor obtained the following findings.

As described above, typically, as the strength (tensile strength) of hot-stamped steel becomes lower, impact absorption properties become higher. When tempering is performed with respect to the hot-stamped steel, it is possible to further lower the tensile strength in comparison to hot-stamped steel having the same chemical composition in the related art. That is, it is possible to enhance the impact absorption properties of the hot-stamped steel.

However, when tempering is performed with respect to hot-stamped steel including a Zn coating layer, a structure of the Zn coating layer varies. The variation in the structure of the Zn coating layer has an effect on phosphate treatability.

The present inventors have made an investigation with respect to an effect on the Zn coating layer by tempering conditions, and an effect on phosphate treatability by the Zn coating layer, in the following manner.

First, a plurality of steel sheets, which satisfy a preferred chemical composition to be described later and have a sheet thickness of 1.6 mm, were prepared. Then, the galvanized layer in which the coating weight of galvanized layer was 60 g/m² was formed on each of the steel sheets using a hot dip galvanizing method. Then, hot-stamping was performed with respect to the steel sheet on which the galvanized layer was formed. Specifically, the steel sheet was charged into a heating furnace in which a furnace temperature was set to 900° C. which is a temperature equal to or higher than an $A_{c3}$ point of the steel sheet, and was heated for 4 minutes. At this time, the temperature of the steel sheet reached 900° C. approximately two minutes after being charged into the furnace. After the heating, the steel sheet was interposed by a flat die equipped with a water-cooling jacket, and the hot-stamping (working and quenching) was performed to produce hot-stamped steel (steel sheet). The cooling rate during the hot-stamping was 50° C/second or faster up to a martensitic transformation start point even in a portion in which cooling rate is slow.

The martensitic transformation start (Ms) point can be determined by measuring thermal expansion when rapidly cooling steel that is heated to an austenitizing temperature and measuring volume expansion from austenite to martensite.

Tempering was performed with respect to respective hot-stamped steel which were produced. The tempering temperature was set to be different between the respective hot-stamped steel in a range of 150° C. to the $A_{c1}$ point of the base metal. The heating time of the respective hot-stamped steel during tempering was set to 5 minutes.

An $A_{c1}$ point and the $A_{c3}$ point respectively represent an austenitic transformation initiation temperature and an austenitic transformation termination temperature during heating of the steel sheet. The $A_{c1}$ point and the $A_{c3}$ point can be determined by measuring thermal expansion during heating the steel in a Formaster test and the like. Specifically, the $A_{c1}$ point and the $A_{c3}$ point can be determined by observing volume constriction during transformation from ferrite to austenite. In addition, the martensitic transformation start point can be determined by measuring thermal expansion when rapidly cooling steel that is heated to an austenitizing temperature. Specifically, the martensitic transformation start point can be determined by measuring volume expansion from austenite to martensite.

Micro-structure observation and XRD measurement were performed with respect to the respective hot-stamped steel which was subjected to the tempering at respective tempering temperatures. In addition, the structure of the Zn coating layer was specified on the basis of results of the micro-structure observation and the XRD measurement.

Figure 2:
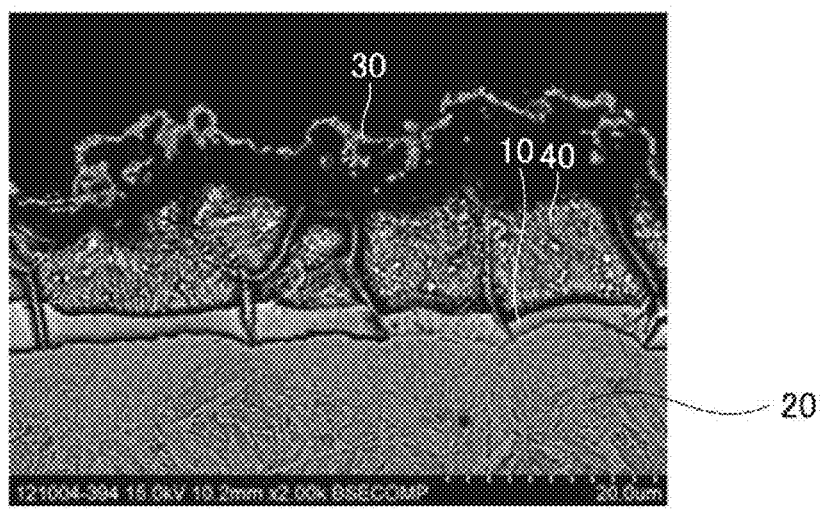
FIG. 2 is a cross-sectional SEM image of the Zn coating layer and the periphery thereof in a case where the hot-stamped steel including the galvanized layer is tempered at 500° C.
Figure 3:
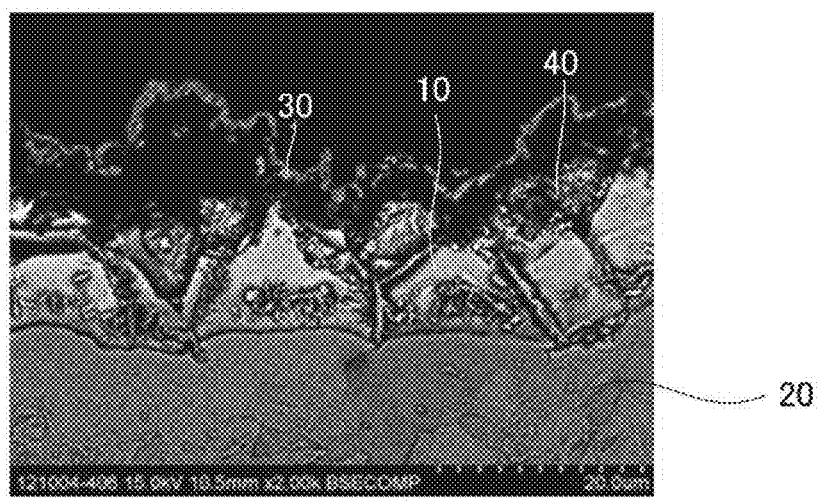
FIG. 3 is a cross-sectional SEM image of the Zn coating layer and the periphery thereof in a case where the hot-stamped steel including the galvanized layer is tempered at 700° C.
Figure 4:
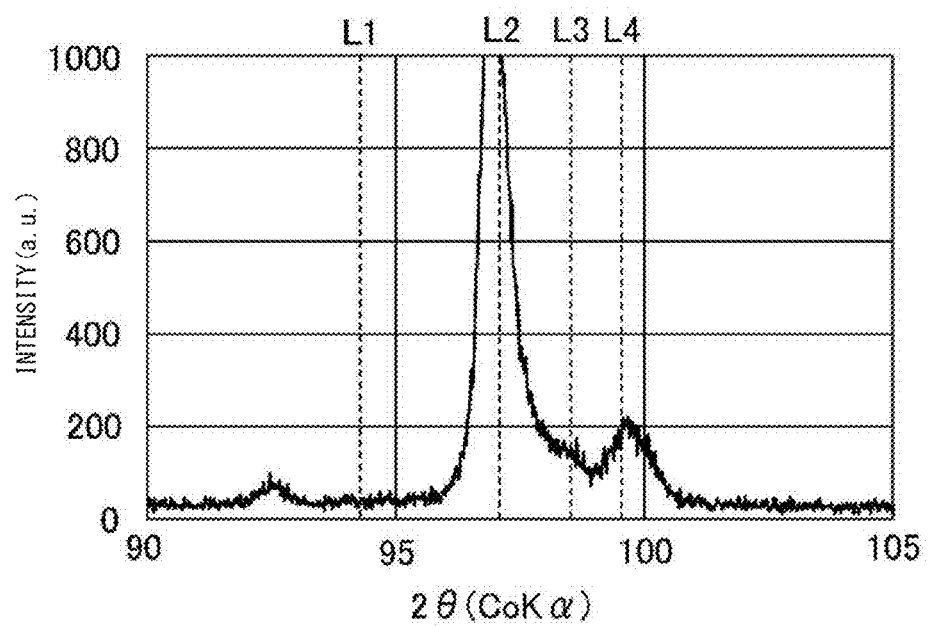
FIG. 4 is a view showing XRD measurement results of the Zn coating layer shown in FIG. 1.
Figure 5:
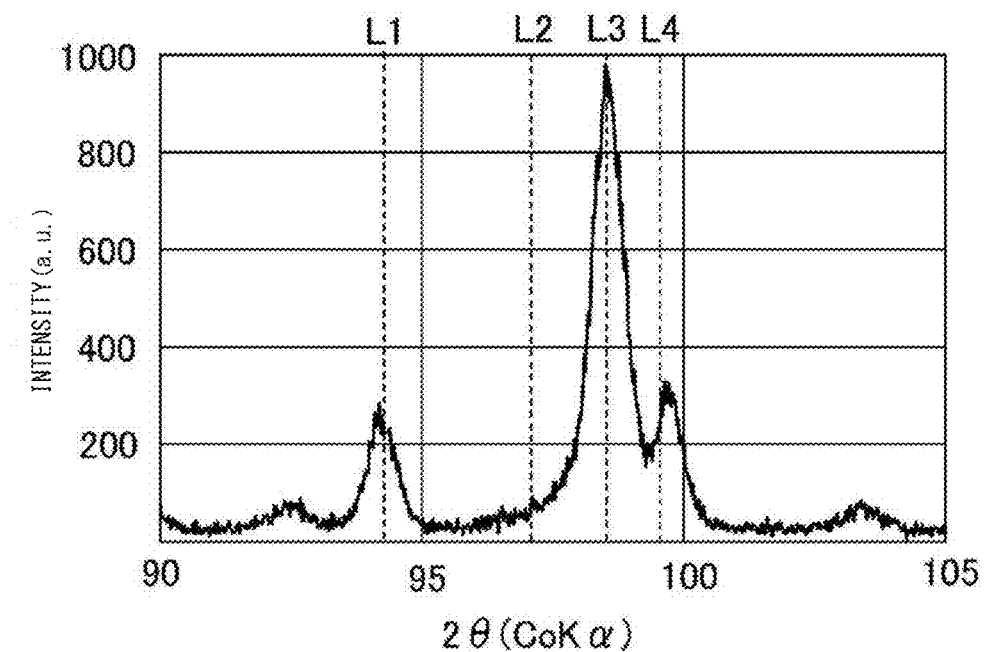
FIG. 5 is a view showing XRD measurement results of the Zn coating layer shown in FIG. 2.
Figure 6:
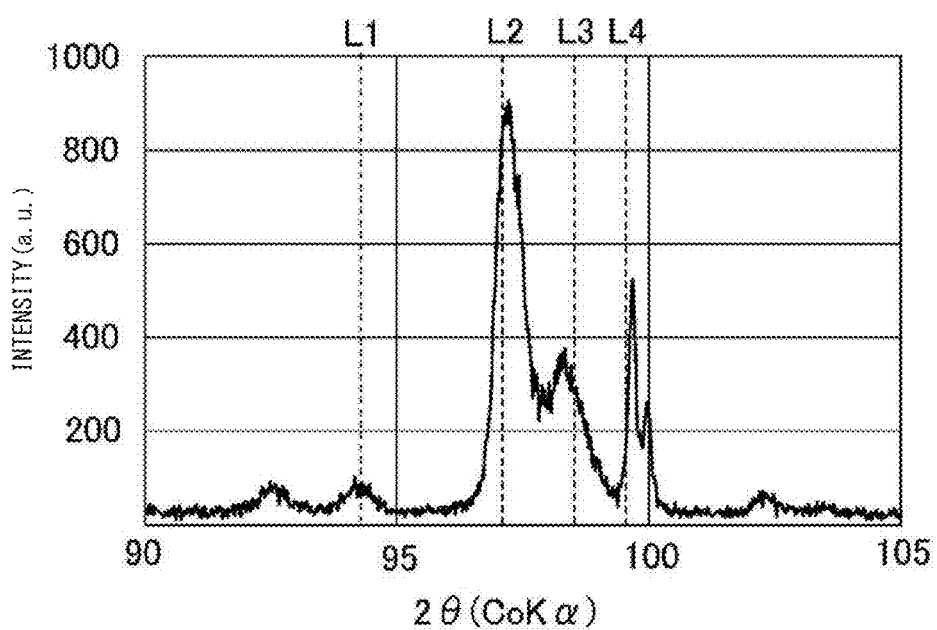
FIG. 6 is a view showing XRD measurement results of the Zn coating layer shown in FIG. 3.

FIG. 1 is a cross-sectional SEM image of the Zn coating layer of the hot-stamped steel and the periphery thereof in a case where the tempering temperature is 400° C. FIG. 4 is an XRD measurement result from the surface FIG. 2 is a cross-sectional SEM image of the Zn coating layer of the hot-stamped steel and the periphery thereof in a case where the tempering temperature is 500° C. FIG. 5 is an XRD measurement result from a surface FIG. 3 is a cross-sectional SEM image of the Zn coating layer of the hot-stamped steel and the periphery thereof in a case where the tempering temperature is 700° C. FIG. 6 is an XRD measurement result from the surface.

The micro-structure observation of the cross-section was performed in the following manner. Specifically, the cross-section was etched with 5% nital for 20 seconds to 40 seconds, and after the etching, the micro-structure was observed with an SEM at a magnification of 2000 times.

The XRD measurement was performed by using a Co tubular bulb. In XRD, the intensity peak of α-Fe is shown at a diffraction angle of 2θ=99.7° and as the solid-solution amount of Zn increases, the intensity peak shifts toward a small-angle side. The intensity peak of capital gamma (Γ), which is an intermetallic compound of $Fe_3Zn_{10}$, is shown at a diffraction angle of 2θ=94.0°. The broken line L4 in FIG. 4 to FIG. 6 indicates the intensity peak position of the α-Fe phase. A broken line L3 indicates an intensity peak position of a solid-solution phase in which the solid-solution amount of Zn is small (the Zn content is 5% by mass to 25% by mass, and hereinafter, also may be referred to as "low Zn solid-solution phase"). The broken line L2 indicates the intensity peak position of a solid-solution phase in which the solid-solution amount of Zn is great (the Zn content is 25% by mass to 40% by mass, and hereinafter, may also be referred to as "high Zn solid-solution phase"). The broken line L1 indicates an intensity peak position of a Γ-phase. As the intensity peak position shifts from the broken line L4 to the broken line L2, the solid-solution amount of Zn in the solid-solution phase increases.

In a case where the tempering temperature is 150 ° C. to lower than 500° C., as shown in FIG. 1 and FIG. 4, the Zn coating layer formed a solid-solution layer 10. The solid-solution layer 10 was the high Zn solid-solution phase in which the intensity peak position is L2. The reference numeral 20 in FIG. 1 represents a tempered portion in the base metal, and a reference numeral 30 represents a zinc oxide layer formed on the Zn coating layer. The zinc oxide layer is not in a metallic state, and thus is not a part of coating layer.

On the other hand, in a case where the tempering temperature is equal to or higher than 500° C. and lower than 700° C., as shown in FIG. 2, the solid-solution layer 10 and a lamella structure layer 40 including the plural phases were observed in the Zn coating layer. From results of the XRD measurement, as shown in FIG. 5, the intensity peak (position of the broken line L3) of the low Zn solid-solution phase, and the intensity peak (position of the broken line L1) of the Γ-phase are shown. That is, the lamella structure layer was a layer (hereinafter, lamella layer) of a lamella structure mainly including the Γ-phase and the low Zn solid-solution phase.

In a case where the tempering temperature is equal to or higher than 500° C. and lower than 700° C., the Zn coating layer included the lamella layer 40 in an area ratio of 30% or greater and the solid-solution layer (including the high Zn solid-solution phase) 10 in an area ratio of 0% to 70%. In addition, the lamella layer 40 was formed on the solid-solution layer 10. That is, the lamella layer 40 was formed on the surface side of the Zn coating layer in comparison to the solid-solution layer. In addition, in a case where the tempering temperature is 600° C., the entirety of the Zn coating layer essentially consists of the lamella layer.

In addition, in a case where the tempering temperature is 700° C., as shown in FIG. 3, the Zn coating layer included a slight amount of the lamella layer 40 in a surface layer, and the solid-solution layer 10 on a lower side (on a steel side) of the lamella layer 40. The area ratio occupied by the lamella layer 40 in the Zn coating layer was 20% or less. In addition, from results of the XRD measurement, as shown in FIG. 6, an intensity peak of the solid-solution phase (at the position of the broken line L2), which was not detected in a case where the tempering temperate was 500° C. to lower than 700° C., was shown. On the other hand, the intensity peak (position of the broken line L1) of the Γ-phase was lowered in comparison to the case where the tempering temperature was 500° C. to lower than 700° C.

As described above, the structure of the Zn coating layer varies depend on the tempering conditions. Accordingly, the phosphate treatability of the hot-stamped steel, which was subjected to the tempering at each tempering temperature, was investigated. As the result, the present inventor found that when the Zn coating layer includes the lamella layer 40 in an area ratio of 30% or greater, excellent phosphate treatability is secured.

The hot-stamped steel according to an embodiment of the present invention (may also be referred to as "hot-stamped steel according to this embodiment") includes, in a case that the highest quenching hardness is defined as a Vickers hardness at a depth position spaced away from a surface by ¼ times a sheet thickness in a case of performing water quenching after heating to a temperature equal to or higher than an $A_{c3}$ point and retaining for 30 minutes, a base metal that is a steel including a tempered portion having a hardness corresponding to 85% or less of the highest quenching hardness and a Zn coating layer that is formed on the tempered portion of the base metal. The Zn coating layer includes a solid-solution layer including a solid-solution phase that contains Fe and Zn that is solid-soluted in Fe, a lamella layer that includes the solid-solution phase and a capital gamma phase. In addition, in the Zn coating layer, an area ratio of the lamella layer is 30 to 100% and an area ratio of the solid-solution layer is 0 to 70%.

Hereinafter, a description will be given of hot-stamped steel according to this embodiment.

[Base Metal]

The base metal is steel, and is formed, for example, by hot-stamping a steel sheet. In addition, the base metal includes a tempered portion. The tempered portion represents a portion having hardness (Vickers hardness) corresponding to 85% or less of the highest quenching hardness of steel. The highest quenching hardness represents the Vickers hardness at a depth position spaced away from a surface layer of steel by a distance equal to ¼ times a sheet thickness in a case of performing water quenching after heating the steel to a temperature equal to or higher than $Ac_3$ point and holding for 30 minutes. The highest quenching hardness can be measured by using another steel (steel different from the hot-stamped steel having the tempered portion) having the same chemical component.

In the hot-stamped steel according to this embodiment, the base metal includes the tempered portion having hardness corresponding to 85% or less of the highest quenching hardness, and thus the tensile strength is lower and the impact absorption properties are more excellent in comparison to hot-stamped steel which has the same chemical composition and is not subjected to tempering. It is preferable that the hardness of the tempered portion is 65% or less of the highest quenching hardness. In this case, the impact absorption properties are further excellent.

Since martensite is a structure in which hardness is high, and the hardness thereof is lowered through tempering, when the base metal has a chemical composition in which martensitic transformation occurs when being subjected to water quenching, it is easy for the base metal to have the tempered portion having hardness corresponding to 85% or less of the highest quenching hardness. Accordingly, it is preferable that the base metal has a chemical composition in which the martensitic transformation occurs in a case of being subjected the water quenching from a temperature equal to or higher than the $A_{c3}$ point. In addition, it is preferable that the tempered portion includes 95% or greater of tempered martensite and less than 5% of residual austenite in terms of % by volume.

It is not necessary to limit the chemical composition of the base metal. However, it is preferable that the base metal has, for example, the following chemical composition. In a case where the base metal has the following chemical composition, it is advantageous to obtain mechanical characteristics which are appropriate for usage in a component for automobiles. In addition, it is advantageous to include the tempered portion having hardness corresponding to 85% or less of the highest quenching hardness. Hereinafter, "%" related to an element represents % by mass.

C: 0.05% to 0.4%

Carbon (C) is an element that enhances the strength of steel (hot-stamped steel) after hot-stamping. When the C content is too small, it is difficult to obtain the above-described effect. According to this, it is preferable the lower limit of the C content is set to 0.05% so as to obtain the effect, and is more preferably 0.10%. On the other hand, when the C content is too great, toughness of the steel sheet decreases. Accordingly, it is preferable that the upper limit of the C content is set to 0.4%, and is more preferably 0.35%.

Si: 0.5% or less

Silicon (Si) is an element that is unavoidably contained in steel. In addition, Si has an effect of deoxidizing steel. According to this, the Si content may be set to 0.05% or greater for deoxidation. However, when the Si content is great, Si has a function of raising the $A_{c3}$ point of the steel sheet. When the $A_{c3}$ point of the steel sheet rises, there is a concern that a heating temperature during hot-stamping exceeds an evaporation temperature of Zn coating. In addition, Si in steel diffuses during heating in the hot-stamping, and thus an oxide is formed on a surface of a steel sheet. The oxide may deteriorate phosphate treatability. In a case where the Si content is greater than 0.5%, the above-described problem becomes significant, and thus it is preferable that the upper limit of the Si content is set to 0.5%, and is more preferably 0.3%.

Mn: 0.5% to 2.5%

Manganese (Mn) is an element that enhances hardenability and enhances the strength of the hot-stamped steel. It is preferable that the lower limit of the Mn content is set to 0.5% so as to obtain this effect, and is more preferably 0.6%. On the other hand, even when the Mn content is greater than 2.5%, the effect is saturated. Accordingly, it is preferable that the upper limit of the Mn content is set to 2.5%, and is more preferably 2.4%.

P: 0.03% or less

Phosphorus (P) is an impurity that is contained in steel. P is segregated to a grain boundary, and deteriorates the toughness of and delayed fracture resistance of steel. According to this, it is preferable that the P content is as low as possible. However, in a case where the P content is greater than 0.03%, the effect of P becomes significant, and thus the P content may be set to 0.03% or less.

S: 0.010% or less

Sulfur (S) is an impurity that is contained in steel. S forms a sulfide and deteriorates toughness and delayed fracture resistance of steel. According to this, it is preferable that the S content is as low as possible. However, in a case where the S content is greater than 0.010%, the effect of S becomes significant, and thus the S content may be set to 0.010% or less.

sol. Al: 0.10% or less

Aluminum (Al) is an element that is effective for deoxidation of steel. To obtain this effect, the lower limit of the Al content may be set to 0.01%. However, when the Al content is too great, the $A_{c3}$ point of a steel sheet rises, and the heating temperature necessary during hot-stamping may exceed the evaporation temperature of Zn coating. Accordingly, it is preferable that the upper limit of the Al content is set to 0.10%, and more preferably 0.05%. The Al content in this embodiment is the sol. Al (acid soluble Al) content.

N: 0.010% or less

Nitrogen (N) is an impurity that is unavoidably contained in steel. N is an element that forms a nitride and deteriorates toughness of steel. In addition, in a case where B is contained, N is coupled to B, and reduces the solid-solution amount of B. When the solid-solution amount of B is reduced, the hardenability deteriorates. From the above-described reason, it is preferable that the N content be as low as possible. However, when the N content is greater than 0.010%, the effect of N becomes significant, and thus the N content may be set to 0.010% or less.

For example, the base metal portion of the hot-stamped steel according to this embodiment may have a chemical composition including the above-described elements, and Fe and impurities as the remainder. However, the base metal portion of the hot-stamped steel according to this embodiment may further contain one or more kinds of arbitrary elements selected from B, Ti, Cr, Mo, Nb, and Ni in place of a part of Fe in the chemical composition in the following range so as to improve the strength or toughness.

In this embodiment, the impurity represents a material that is mixed-in from ore and scrap as a raw material during industrially manufacturing a steel material, or due to the manufacturing environment and the like.

B: 0.0001% to 0.0050%

Boron (B) enhances the hardenability of steel, and enhances the strength of the hot-stamped steel. In order to obtain the effect, the preferable lower limit of the B content is 0.0001%. However, when the B content is too great, the effect is saturated. Accordingly, even in a case where B is contained, it is preferable that the upper limit of the B content is set to 0.0050%.

Ti: 0.01% to 0.10%

Titanium (Ti) is coupled to N, and forms a nitride (TiN). As a result, binding B with N is limited, and thus it is possible to limit the deterioration of hardenability which is caused by formation of BN. In addition, Ti makes an austenite grain size fine during heating in hot-stamping due to a pinning effect, and enhances the toughness of the steel and the like. To obtain this effect, the preferable lower limit of the Ti content is 0.01%. However, when the Ti content is too great, the above-described effect is saturated, and a Ti nitride excessively precipitates, and thus the toughness of steel deteriorates. Accordingly, even when Ti is contained, it is preferable that the upper limit of the Ti content is set to 0.10%.

Cr: 0.1% to 0.5% Chromium (Cr) enhances the hardenability of steel. To obtain this effect, the preferable lower limit of the Cr content is 0.1%. However, when the Cr content is too great, Cr carbide is formed, and the carbide is less likely to be dissolved during heating in hot-stamping. As a result, austenitizing of steel is less likely to progress, and thus the hardenability deteriorates. Accordingly, even in a case where Cr is contained, it is preferable that the upper limit of the Cr content is set to 0.5%.

Mo: 0.05% to 0.50%

Molybdenum (Mo) enhances the hardenability of steel. To obtain this effect, the preferable lower limit of the Mo content is 0.05%. However, when the Mo content is too great, the above-described effect is saturated. Accordingly, even in a case where Mo is contained, it is preferable that the upper limit of the Mo content is set to 0.50%.

Nb: 0.02% to 0.10%

Niobium (Nb) forms carbide, and makes a grain size fine during hot-stamping. When the grain size becomes fine, the toughness of steel is improved. To obtain this effect, the preferable lower limit of the Nb content is 0.02%. However, when the Nb content is too great, the above-described effect is saturated, and the hardenability deteriorates. Accordingly, even in a case where Nb is contained, it is preferable that the upper limit of the Nb content is set to 0.10%.

Ni: 0.1% to 1.0%

Nickel (Ni) enhances the toughness of steel. In addition, Ni limits embrittlement caused by molten Zn during heating in hot-stamping of galvanized steel. To obtain this effect, the preferable lower limit of the Ni content is 0.1%. However, when the Ni content is too great, the above-described effect is saturated, and an increase in the cost is caused. Accordingly, even in a case where Ni is contained, it is preferable that the upper limit of the Ni content be set to 1.0%.

A part of the base metal may be the tempered portion, or the entirety of the base metal may be the tempered portion.

Recently, a component, in which a demand for performance such as strength and ductility is different in accordance with a position, has been required. The performance is called a tailored property. For example, with regard to an automobile component, in a frame component called B pillar (center pillar), an upper portion, which constitutes a getting-on area, is required to have high strength, and a lower portion is required to have high impact absorption properties.

In a case where only a part of the base metal in the hot-stamped steel including the Zn coating layer is configured as the tempered portion, it is possible to obtain a component which includes the high-strength portion and has impact absorption properties. In addition, since the hot-stamped steel includes the Zn coating layer, the corrosion resistance is also excellent.

The tensile strength of the tempered portion of the base metal is, for example, 600 MPa to 1450 MPa, and the Vickers hardness is 180 Hv to 450 Hv. In this case, the strength of the tempered portion of the hot-stamped steel becomes lower in comparison to hot-stamped steel, which is not subjected to tempering, in the related art. According to this, the impact absorption properties are more excellent in comparison to the hot-stamped steel of the related art.

The Vickers hardness of tempered martensite is lower than Vickers hardness of martensite. Accordingly, it is possible to determine whether or not a micro-structure of the tempered portion is tempered martensite in accordance with the Vickers hardness.

The Vickers hardness can be obtained through a Vickers hardness test in conformity to JIS Z2244 (2009). The test force in the Vickers in the Vickers hardness test is set to 10 kgf=98.07 N.

[Zn Coating Layer]

The hot-stamped steel according to this embodiment includes a Zn coating layer at least on the tempered portion of the base metal. The Zn coating layer includes a lamella layer in an area ratio of 30% or more and a solid-solution layer of 0 to 70%.

The solid-solution layer includes a solid-solution phase. The solid-solution phase contains Fe, and Zn that is solid-soluted in Fe. It is preferable that the Zn content in the solid-solution layer is 25% by mass to 40% by mass, and is more preferably 30% by mass to 40% by mass.

The Zn coating layer is not required to include the solid-solution layer. That is, the Zn coating layer may consist of the lamella layer and the area ratio of solid-solution layer may be 0%.

The lamella layer has a lamella structure including a solid-solution phase and a capital gamma (Γ) phase. As shown in FIG. 2, the lamella structure is a structure in which different phases (the solid-solution phase and the Γ-phase in this embodiment) are repetitively and alternately adjacent to each other. The Γ-phase is an intermetallic compound ($Fe_3Zn_{10}$). The Zn content in the solid-solution phase of the lamella layer is 5% by mass to 25% by mass, and is lower than the Zn content in the solid-solution layer. The lamella layer is formed on a surface layer side of the Zn coating layer.

That is, when the solid-solution layer is present, the lamella layer is formed on the solid-solution layer.

The lamella layer is more excellent in phosphate treatability in comparison to the solid-solution layer. The reason for this is considered as follows. As described above, the lamella layer has a lamella structure of the solid-solution phase (low Zn solid-solution phase) and the Γ-phase. In the lamella structure, the solid-solution phase and the Γ-phase extend in a direction that is approximately perpendicular to a surface of the base metal. In addition, as described above, the lamella layer is formed on a surface layer side of the Zn coating layer. Accordingly, when observing the Zn coating layer from the cross section, both of the solid-solution phase and the Γ-phase are observed in the surface layer. When phosphate treatment is performed with respect to the Zn coating layer having the lamella structure as described above, the surface of the Zn coating layer, that is, the lamella layer is etched. At this time, a portion, in which the concentration of Zn is high, is preferentially etched. The concentration of Zn in the Γ-phase in the lamella layer is higher than the concentration of Zn in the solid-solution phase, and thus the Γ-phase is preferentially etched in comparison to the solid-solution phase. As a result, fine unevenness is formed on the surface of the Zn coating layer, and thus a phosphate is likely to adhere to the surface.

Accordingly, the phosphate treatability of the Zn coating layer including the lamella layer in surface layer is higher in comparison to the Zn coating layer including only the solid-solution layer in surface layer. When the area ratio of the lamella layer in the Zn coating layer is 30% or more, the phosphate treatability of the Zn coating layer is improved. Therefore, it is necessary to include the area ratio of the 30% or more of the lamella layer in Zn coating layer in the hot-stamped steel according to this embodiment. It is preferable that the area ratio of the lamella layer is 80% or more. When the area ratio of the lamella layer is 80% or more, the phosphate treatability is more improved. In addition, it is expected that the chemical crystal becomes fine and film adhesiveness is improved.

The Zn content in the solid-solution phase (the high Zn solid-solution phase or the low Zn solid-solution phase) can be measured by the following method. In a case of measuring the Zn content of the high Zn solid-solution phase, the Zn content (% by mass) is measured at arbitrary 5 sites on the high Zn solid-solution phase by using electron beam probe microanalyzer (EPMA), and the average of the Zn content at the 5 sites may be defined as the Zn content in the high Zn solid-solution phase. With regard to the low Zn solid-solution phase, the Zn content can be obtained by the same method as in the high Zn solid-solution phase.

[Method of Producing Hot-Stamped Steel]

The hot-stamped steel according to this embodiment can exhibit the effect thereof without limitation to a producing method thereof as long as the base metal and the Zn coating layer as described above are provided. For example, the hot-stamped steel can be produced by the following producing method including a process of preparing steel that is a base metal (process of preparing the base metal), a process of forming a galvanized layer on the base metal (a galvanizing process), a process of performing hot-stamping with respect to the base metal that includes a Zn coating layer (hot-stamping process), and a process of performing tempering with respect to hot-stamped steel (tempering process). Hereinafter, a description will be given of a preferred example in the respective processes.

[Process of Preparing Base Metal]

First, a steel sheet, which is used as the base metal, is prepared. For example, molten steel having the above-described preferable range of chemical composition is prepared. Slab is prepared by using the produced molten steel in accordance with a casting method such as continuous casting. An ingot may be produced in place of the slab by using produced molten steel in accordance with an ingot-making method. The slab or the ingot, which is produced, is hot-rolled to produce a steel sheet (hot-rolled steel sheet). Pickling may be additionally performed with respect to the hot-rolled steel sheet as necessary, and cold-rolling may be performed with respect to the resultant hot-rolled steel sheet after the pickling to obtain a steel sheet (cold-rolled steel sheet). The hot-rolling, the pickling, and the cold-rolling may be performed by a known method in conformity to characteristics which are required for a component to which the steel sheet is applied.

[Galvanizing Process]

Galvanizing is performed with respect to the above-described steel sheet (the hot-rolled steel sheet or the cold-rolled steel sheet) to form a galvanized layer on a surface of the steel sheet. A method of forming the galvanized layer may be a hot-dip galvanizing, galvannealing, or electrogalvanizing without particular limitation.

For example, formation of the galvanized layer through the hot-dip galvanizing is performed in the following manner. Specifically, a steel sheet is immersed in a galvanizing bath (hot-dip galvanizing bath) so as to allow coating to adhere to a surface of the steel sheet. The steel sheet, to which the coating adheres, is pulled up from the galvanizing bath. Preferably, the coating weight of galvanizing layer on the surface of the steel sheet is adjusted to 20 g/m$^2$ to 100 g/m$^2$. The coating weight of galvanizing layer can be adjusted by adjusting the pulling-up speed of the steel sheet or the flow rate of a wiping gas. The concentration of Al in the hot-dip galvanizing bath is not particularly limited.

Through the above-described processes, a steel sheet for hot-stamping (GI), which includes the galvanized layer (hot-dip galvanized layer), is produced.

For example, formation of the galvanized layer through the galvannealing (hereinafter, also referred to "alloying process") is performed in the following manner. Specifically, the steel sheet, on which the hot-dip galvanized layer is formed, is heated to 470° C. to 600° C. After the heating, soaking is performed as necessary, and then the steel sheet is cooled down. The soaking time is preferably 30 seconds or shorter, but there is no limitation of the soaking time. In addition, immediately after heating to the heating temperature, the steel sheet may be cooled down without performing the soaking. The heating temperature and the soaking time are appropriately set in accordance with a desired concentration of Fe in the resultant coating layer. The preferable lower limit of the heating temperature in the alloying process is 540° C.

Through the above-described alloying process, a steel sheet for hot-stamping (GA), which includes the galvanized layer (galvannealed layer), is produced.

For example, formation of the galvanized layer through the electrogalvanizing is performed in the following manner. Specifically, as an electrogalvanizing bath, any one of a sulfuric acid bath, a hydrochloric acid bath, a zincate bath, and a cyan bath, which are known, is prepared. The above-described steel sheet is pickled, and the steel sheet after the pickling is immersed in the electrogalvanizing bath. A current is allowed to flow through the electrogalvanizing bath in a state in which the steel sheet is set as a negative electrode. According to this, zinc precipitates to a surface of the steel sheet, and thus the galvanized layer (electrogalvanized layer) is formed.

Through the above-described processes, a steel sheet for hot-stamping (EG), which includes the electrogalvanized layer, is produced.

In a case where the galvanized layer is the galvannealed layer, and in a case where the galvanized layer is the electrogalvanized layer, a preferable coating weight of the galvanized layer is the same as in the case of the hot-dip galvanized layer. That is, the preferable coating weight of the galvanized layer is 20 g/m$^2$ to 100 g/m$^2$.

These galvanized layers contain Zn. Specifically, the chemical composition of the hot-dip galvanized layer and the electrogalvanized layer include Zn and impurities. The chemical composition of the galvannealed layer contains 5% to 20% of Fe, and the remainder includes Zn and impurities.

[Hot-Stamping Process]

Hot-stamping is performed with respect to the above-described steel sheet including the galvanized layer for hot-stamping. During heating before quenching in the hot-stamping process, it is preferable to perform heating by mainly using radiant heat.

Specifically, first, a steel sheet for hot-stamping is charged into a heating furnace (a gas furnace, an electrical furnace, an infrared furnace, and the like). In the heating furnace, the steel sheet for hot-stamping is heated at the $A_{c3}$ point to 950° C., and is retained (soaked) at this temperature. Zn in a coating layer is liquefied through the heating, and molten Zn and Fe in the coating layer mutually diffuse and form a solid-solution phase (Fe—Zn solid-solution phase) during soaking. After the molten Zn in the coating layer is solid-soluted in Fe and becomes a solid-solution phase, the steel sheet is taken out from the heating furnace. Hot-stamping (pressing and quenching) is performed with respect to the steel sheet that is taken out from the heating furnace, thereby obtaining the hot-stamped steel. A preferable soaking time is 0 to 10 minutes. It is preferable that the soaking time be 0 to 6 minutes, and is more preferably 0 to 4 minutes.

In the hot-stamping, the steel sheet is pressed by using a die in which a cooling medium (for example, water) is circulated through the inside thereof. When pressing the steel sheet, the steel sheet is quenched due to heat sink from the die. Through the above-described processes, hot-stamped steel is produced.

In the above description, the steel for hot-stamping is heated by using the heating furnace. However, the steel for hot-stamping may be heated through electrical heating. Even in this case, the steel sheet is soaked for a predetermined time through the electrical heating to allow the molten Zn in the galvanized layer to be a solid-solution phase. After the molten Zn in the galvanized layer becomes a solid-solution phase, the steel sheet is pressed by using a die.

[Tempering Process]

Tempering is performed with respect to the hot-stamped steel (steel after the hot-stamping). A tempering temperature is 500° C. or more and less than 700° C.

When the tempering temperature is 500° C. or more and less than 700° C., the Zn coating layer after tempering includes the lamella layer of 30% or more, in area ratio. Furthermore, in a case where the microstructure of the base metal before tempering is martensite, the microstructure of the base metal after tempering becomes tempered martensite and the tempered portion having hardness corresponding to 85% or less of the highest quenching hardness can be obtained.

The reason why the area ratio of the lamella layer is 30% or more when the tempering temperature is 500° C. or more and less than 700° C. is considered to be as follows.

Figure 7:
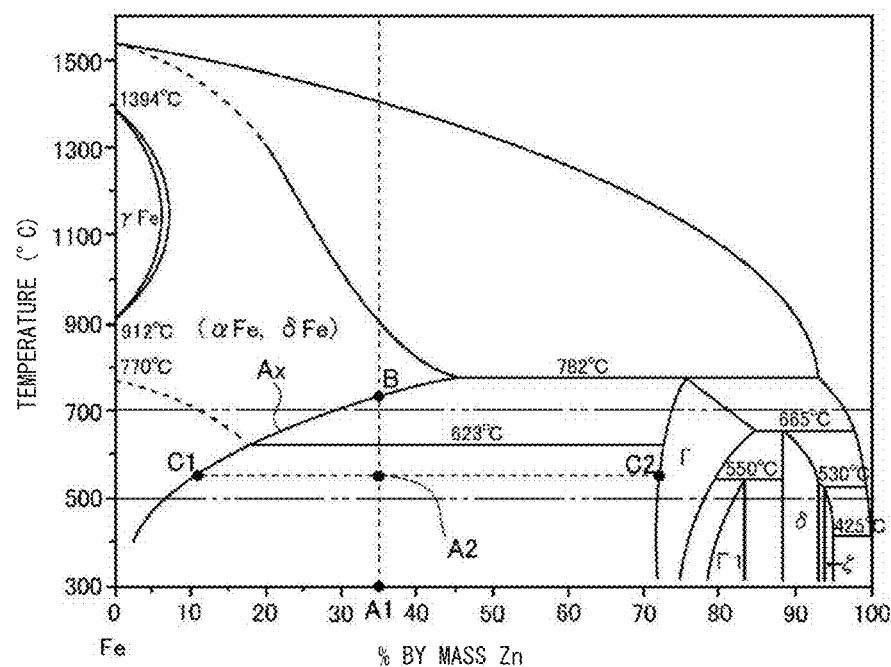
FIG. 7 is a Fe—Zn binary phase diagram.

FIG. 7 is a Fe—Zn binary phase diagram. The Zn coating layer of the hot-stamped steel produced through the hot-stamping includes a solid-solution phase in which approximately 25% by mass to 40% by mass of Zn is solid-soluted in α-Fe. However, a structure (that is, a lamella layer) including two phases, which includes the low Zn solid-solution phase in which 5% by mass to 25% by mass of Zn is solid-soluted in α-Fe, and the Γ-phase, is stable at room temperature in consideration of free energy. That is, the solid-solution phase of the Zn coating layer after the hot-stamping is a solid-solution in which Zn is oversaturated.

On the assumption that the concentration of Zn in the Zn coating layer is 35% by mass in FIG. 7 (corresponds to a point A1 in the drawing). A driving force for two-phase separation from the solid-solution phase into the low Zn solid-solution phase and the Γ-phase is generated on a lower temperature side from a point B on a boundary line Ax, and becomes strong as it goes toward a low temperature side from the point B. On the other hand, as a temperature becomes higher, the diffusion rate in the Zn coating layer increases. Accordingly, whether or not the lamella layer is formed after the tempering is determined from a relationship between the driving force for two-phase separation, and the diffusion rate. Specifically, as the driving force for two-phase separation is higher and the diffusion rate increases, the lamella layer is likely to be formed.

In a case where the temperature (tempering temperature) in the Zn coating layer during the tempering is in a low-temperature region (150° C. to lower than 500° C.) (for example, a point A1 of 300° C.), it is sufficiently spaced away from the boundary line Ax (point B). In this case, the driving force for two-phase separation is high. However, since a temperature is low, the diffusion rate of Zn is too slow. According to this, even when performing the tempering, the Zn coating layer is not separated into the two phases, and the lamella layer is not formed.

In a case where the tempering temperature is 500° C. to lower than 700° C., the temperature region is close to the boundary line Ax (point B), but a certain degree of distance is present (for example, a point A2 in the drawing). In this case, the driving force for two-phase separation is present to a certain extent. In addition, the temperature region increases in comparison to the low-temperature region, and thus the diffusion rate is fast. As a result, the Zn coating layer is separated into the two phases to form the lamella layer. At A2 in FIG. 7, the Zn coating layer is separated into the Γ-phase in which the Zn content is approximately 70% by mass (C2 in the drawing) and the solid-solution phase in which the Zn content is approximately 10% by mass (C1 in the drawing), and the lamella layer is formed.

On the other hand, when the tempering temperature further rises and reaches 700° C. or higher, the temperature region approaches the vicinity of the boundary line Ax or exceeds the boundary line Ax. In this case, the diffusion rate becomes fast due to the temperature rise, but the driving force for two-phase separation is very small or the driving force does not occur. As a result, separation into the two phases is less likely to occur and the area ratio of the lamella layer in the Zn coating layer becomes 30% or less.

According to the above mechanism, when the tempering is performed with respect to the hot-stamped steel including the Zn coating layer, the structure of the Zn coating layer varies depending on the tempering temperature.

When the tempering temperature is set to be 500° C. or more and less than 700° C., it is possible to form the lamella layer of 30% or more, in area ratio, in the Zn coating layer. In addition, in this case, it is possible to obtain excellent phosphate treatability.

The tempering can be performed with respect to only a part of the hot-stamped steel. For example, the tempering can be performed with respect to a part of the hot-stamped steel through induction heating by using a high frequency or electrical heating.

When the tempering is performed with respect to only a part of the hot-stamped steel, strength can be made to vary in the same component between a portion for which the tempering is performed and a portion for which the tempering is not performed. For example, a component as described above is applicable to a component such as a B pillar of an automobile in which an upper portion is required to have high strength and a lower portion is required to have high impact absorption properties. In addition, a tempered portion even in the partial tempering is the same as the tempered portion in a case where the entirety is tempered.

Through the producing method including the above-described processes, it is possible to produce a hot-stamped steel which includes the base metal including the tempered portion having a hardness corresponding to 85% or less of the highest quenching hardness, and the galvanized layer, and in which the area ratio of the lamella layer in the galvanized layer is 30% or more.

The method of producing the hot-stamped steel according to this embodiment may further include the following processes.

[Anti-Rust Oil Film Forming Process]

The above-described producing method may further include an anti-rust oil film forming process between the galvanizing process and the hot-stamping process.

In the anti-rust oil film forming process, an anti-rust oil is applied to a surface of the steel for hot-stamping to form the anti-rust oil film. The steel for hot-stamping may be left for a long period of time before performing the hot-stamping process after being rolled. In this case, the surface of the steel for hot-stamping may be oxidized. According to this process, the anti-rust oil film is formed on the surface of the steel for hot-stamping, and thus the surface of the steel sheet is less likely to be oxidized. Accordingly, generation of scale is limited.

[Blanking Process]

In addition, the above-described producing method may further include a blanking process between the anti-rust oil film forming process and the hot-stamping process.

In the blanking process, shearing and/or punching, and the like are performed with respect to the steel for hot-stamping for shaping (blanking) into a specific shape. A shear plane of the steel sheet after the blanking is likely to be oxidized. However, when the anti-rust oil film is formed on the surface of the steel sheet, an anti-rust oil also spreads to the shear plane to a certain extent. According to this, oxidation of the steel sheet after the blanking is limited.

EXAMPLES

A description will be given of the present invention using examples.

Slab was prepared by using molten steel having chemical compositions A to G in accordance with continuous casting method, and the slab was hot-rolled to obtain a hot-rolled steel sheet. The hot-rolled steel sheet was pickled, and after pickling, cold-rolling was performed to obtain a cold-rolled steel sheet having a sheet thickness of 1.6 mm. The cold-rolled steel sheet, which was obtained, was set as a steel sheet that is used to produce the hot-stamped steel.

The Vickers hardness was measured with respect to the steel sheet at a depth position spaced away from a surface by ¼ times a sheet thickness after the water quenching, and the Vickers hardness that was obtained was defined as the highest quenching hardness B0 (HV). A Vickers hardness test was performed in conformity to JIS Z2244 (2009), and the test force was set to 10 kgf=98.07 N.

Galvanizing, hot-stamping, and tempering were performed by using each of cooled-rolled steel sheets having the chemical compositions of Steel type A to G under conditions in which the coating weight is as shown in Table 2, thereby producing hot-stamped steel in each of Test Nos. 1 to 14.

TABLE 1

| Steel type | Sheet thickness (mm) | Chemical composition (unit is % by mass, and the remainder includes Fe and impurities) | | | | | | | | | | | | | Highest quenching hardness B0 (UV) |
|---|---|---|---|---|---|---|---|---|---|---|---|---|---|---|---|
| | | C | Si | Mn | P | S | solAl | N | B | Ti | Cr | Mo | Nb | Ni | |
| A | 1.6 | 0.2 | 0.2 | 1.3 | 0.01 | 0.005 | 0.02 | 0.002 | 0.002 | 0.02 | 0.2 | — | — | — | 514 |
| B | 1.6 | 0.2 | 0.5 | 1.3 | 0.01 | 0.005 | 0.02 | 0.002 | 0.002 | 0.02 | 0.2 | — | — | — | 512 |
| C | 1.6 | 0.2 | 0.5 | 1.3 | 0.01 | 0.005 | 0.02 | 0.002 | 0.002 | 0.02 | 0.2 | — | 0.05 | — | 519 |
| D | 1.6 | 0.2 | 0.5 | 1.3 | 0.01 | 0.005 | 0.02 | 0.002 | 0.002 | 0.02 | 0.2 | — | — | 1.0 | 518 |
| E | 1.6 | 0.2 | 0.5 | 1.3 | 0.01 | 0.005 | 0.02 | 0.002 | 0.002 | 0.02 | 0.2 | 0.5 | — | — | 519 |
| F | 1.6 | 0.2 | 0.2 | 1.3 | 0.01 | 0.005 | 0.02 | 0.002 | — | — | — | — | — | — | 515 |
| G | 1.6 | 0.3 | 0.2 | 1.3 | 0.01 | 0.005 | 0.02 | 0.002 | 0.002 | 0.02 | 0.2 | — | — | — | 609 |

To investigate the highest quenching hardness, a part of a steel sheet having each of the chemical compositions of Steel type A to G was collected, and was heated at a temperature of the $A_{c3}$ point or higher. Then, water quenching was performed after retention for 30 minutes. In any kind of steel sheet, a structure after the water quenching was full martensite.

TABLE 2

| | | Zn coating layer after galvanizing | | | Hot-stamped steel | | | | | | | |
|---|---|---|---|---|---|---|---|---|---|---|---|---|
| Test No. | Steel type | Composition | coating weight (g/m²) | Tempering temperature (° C.) | Solid-solution layer Area ratio (%) | Lamella layer Area ratio (%) | Vickers Hardness B1 (HV10) | B1/B0 | Area ratio TR (%) | Hardness | phospahte treatability | Over all |
| 1 | A | Zn-12% Fe | 60 | 510 | 30 | 70 | 313 | 60.9 | 39.8 | G | G | G |
| 2 | B | Zn-12% Fe | 60 | 550 | 20 | 80 | 294 | 57.4 | 38.4 | G | G | G |
| 3 | C | Zn-12% Fe | 60 | 600 | 10 | 90 | 281 | 54.1 | 35.9 | G | G | G |
| 4 | D | Zn-12% Fe | 60 | 600 | 10 | 90 | 264 | 51.0 | 37.3 | G | G | G |
| 5 | E | Zn-12% Fe | 60 | 600 | 10 | 90 | 273 | 52.6 | 34.6 | G | G | G |
| 6 | F | Zn | 60 | 500 | 30 | 70 | 331 | 64.3 | 39.7 | G | G | G |
| 7 | F | Zn-12% Fe | 60 | 600 | 10 | 90 | 275 | 53.4 | 37.2 | G | G | G |
| 8 | F | Zn-12% Fe | 60 | 650 | 60 | 40 | 250 | 48.5 | 30.9 | G | G | G |
| 9 | F | Zn-12% Fe | 60 | 300 | 100 | 0 | 445 | 86.4 | 27.7 | NG | NG | NG |
| 10 | F | Zn-12% Fe | 60 | 400 | 100 | 0 | 414 | 80.4 | 75.9 | G | NG | NG |
| 11 | F | Zn-12% Fe | 60 | 460 | 80 | 20 | 347 | 67.4 | 25.9 | G | NG | NG |
| 12 | F | Zn-12% Fe | 60 | 700 | 80 | 20 | 734 | 45.4 | 27.6 | G | NG | NG |
| 13 | F | Zn-12% Fe | 60 | 720 | 90 | 10 | 214 | 41.6 | 26.9 | G | NG | NG |
| 14 | F | Zn-12% Fe | 60 | — | 100 | 0 | 484 | 94.0 | 24.8 | NG | NG | NG |
| 15 | G | Zn-12% Fe | 60 | 600 | 10 | 90 | 334 | 54.8 | 35.7 | G | G | G |
| 16 | F | Zn-12% Fe | 60 | 600 | 40 | 60 | 284 | 55.1 | 33.7 | G | G | G |

In Test No. 6, a hot-dip galvanized layer (GI) was formed on the steel sheet through hot-dip galvanizing. In Test Numbers other than Test No. 6, an alloying process was further performed with respect to the steel sheet including the hot-dip galvanized layer to form a galvannealed layer (GA). In the alloying process, the highest temperature was set to approximately 530° C. in each case, and after heating for approximately 30 seconds, cooling was performed to room temperature.

The Fe content in the galvannealed layer was 12% in terms of % by mass. The Fe content was obtained by the following measurement method. First, a sample of a steel sheet including the galvannealed layer was collected. The Fe content (% by mass) was measured at arbitrary 5 sites inside the galvannealed layer in the sample by using electron probe micro analyzer (EPMA). The average of the resultant measured values was defined as the Fe content (% by mass) of the galvannealed layer of a corresponding test number.

The coating weight of galvanized layer (the hot-dip galvanized layer or the galvannealed layer) was measured by the following method. First, a sample including a coating layer was collected from each of the steel sheets, and the coating layer of the sample was dissolved in hydrochloric acid in conformity to JIS H0401. The coating weight (g/m$^2$) of galvanized layer was obtained on the basis of a sample weight before dissolution, the sample weight after dissolution, and the galvanized layer formed area. The measured results are shown in the column labeled "coating weight" in Table 2.

After forming the coating layer, hot-stamping by heating was performed with respect to the steel sheet in each of the test numbers. Specifically, the steel sheet was charged into a heating furnace in which the furnace temperature was set to 900° C., that is a temperature equal to or higher than the $A_{c3}$ point of the steel sheet, and was heated at 900° C., that is a temperature equal to or higher than the $A_{c3}$ point of each of the Steel Nos. A to G by using radiant heat for 4 minutes. At this time, the temperature of the steel sheet reached 900° C. after approximately 2 to 2.5 minutes after being charged into the furnace, and the steel sheet was soaked at 900° C. for 1.5 to 2 minutes.

After soaking, the steel sheet was interposed by a flat die equipped with a water-cooling jacket to produce the hot-stamped steel (steel sheet). At this time, even at a portion in which a cooling rate during the hot-stamping was slow, quenching was performed in such a manner that a cooling rate up to a martensitic transformation start point became 50° C./second.

In addition, tempering was performed with respect to Test Nos. 1 to 13, 15, and 16 after hot-stamping. In Test No. 1 to 13, and 15, each of steel was charged into a heat treatment furnace. That is, tempering was performed with respect to entirety of the each of steel sheets. In Test No. 16, the tempering was performed to a part of the steel by applying an electrical current to the part of steel through electrical heating. The tempering temperature in each test number was set as shown in Table 2, and the heating time was set to 5 minutes when the steel was charged into a heating furnace or was set to 20 seconds when electrical heating is performed. Tempering was not performed with respect to steel of Test No. 14. Through the above-described processes, hot-stamped steel was produced in each of Test Nos. 1 to 16.

A Vickers hardness test, micro-structure observation of the galvanized layer, and the evaluation test for phosphate treatability were performed with respect to the hot-stamped steel in each of Test Nos. 1 to 16. Regarding the hot-stamped steel of the in which the tempering was performed to a part of the steel, evaluation of the tempered portion was carried out.

[Vickers Hardness Test]

A sample was collected from the base metal of the steel (steel sheet) in each of the test numbers at the center in a sheet thickness direction. The Vickers hardness test conforming to JIS Z2244 (2009) was performed with respect to a surface (corresponding to a surface perpendicular to a rolling direction of the steel sheet (L cross section)) of the sample. The test force was set to 10 kgf=98.07 N. B1/B0× 100(%), which is a ratio between Vickers hardness B1 (HV10) that was obtained and the highest quenching hardness B0, is shown in Table 2.

[Micro-Structure Observation of Zn Coating Layer]

A sample including the Zn coating layer was collected from steel in each of the test numbers. Among surfaces of the sample, a cross-section perpendicular to the rolling direction was etched with 5% by mass of nital. A cross-section of the Zn coating layer that was etched was observed with a SEM at a magnification of 2000 times to determine whether or not the solid-solution layer and the lamella layer were present.

In a case where the lamella layer was observed, the area ratio of the lamella layer was further obtained by the following method. At 5 arbitrary visual fields (50 µm×50 µm) on the cross-section, the area ratio (%) of the solid-solution layer and the area ratio (%) of the lamella layer with respect to the entirety of the area of the Zn coating layer were obtained. At this time, a Zn oxide layer (indicated by a reference numeral 30 in FIG. 1), which floats to a surface, was not included to the area of the Zn coating layer since the zinc oxide layer is not in a metallic state and is not coating layer. Area ratios (%) of the solid-solution layer and the lamella layer, which were obtained, are shown in Table 2.

Measurement by the EPMA was performed with respect to the solid-solution layer, which was observed through the micro-structure observation, by the above-described method. As a result, Zn content in the solid-solution layer, which was observed, was 25% by mass to 40% by mass in all cases.

[Phosphate Treatability Property Evaluation Test]

Surface conditioning was performed with respect to the hot-stamped steel in each of the test numbers at room temperature for 20 seconds using a surface conditioning agent (PREPALENE (product name), produced by Nihon Parkerizing Co., Ltd.). In addition, a phosphate treatment was performed using a zinc phosphate treatment solution (PEARLBOND 3020 (product name), produced by Nihon Parkerizing Co., Ltd.). The temperature of the treatment solution was set to 43° C., and the hot-stamped steel was immersed in the treatment solution for 120 seconds.

Figure 8:
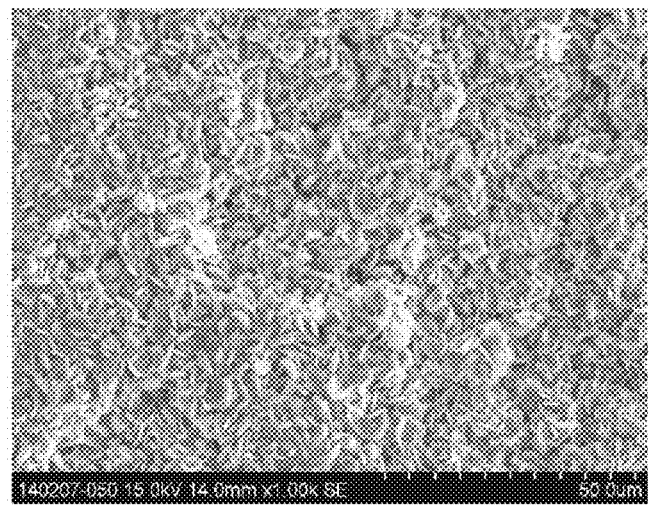
FIG. 8 is a SEM image of the surface of the steel of Examples in a case where hot-stamped steel tempered at 500° C. is subjected to phosphate treatment.
Figure 9:
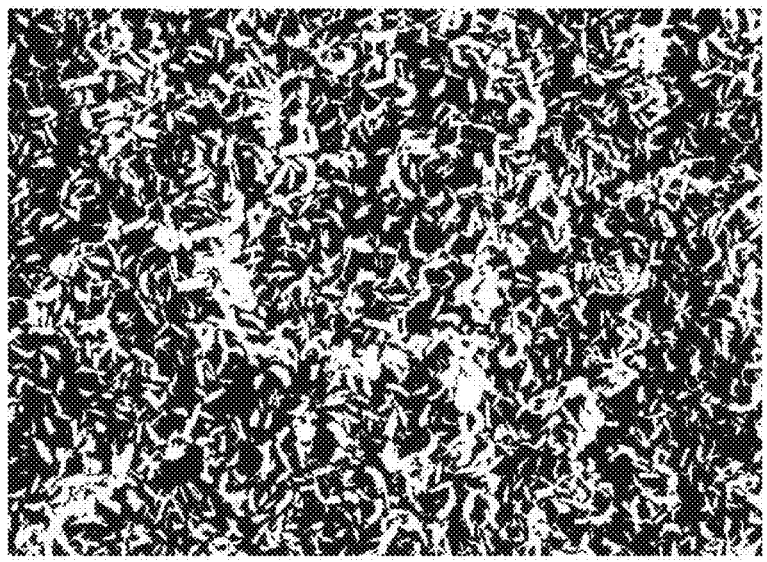
FIG. 9 is a binarized image of the SEM image of FIG. 8.

After the phosphate treatment, arbitrary 5 visual fields (125 µm×90 µm) of the hot-stamped steel were observed with a scanning electron microscope (SEM) at a magnification of 1000 times. FIG. 8 is a SEM image (at a magnification of 1000 times) of surface of the hot-stamped steel in which the phosphate treatment is performed with respect to the hot-stamped steel tempered at 500° C. (Test No.6). Binarization processing was performed with respect to the resultant SEM image. FIG. 9 is an image by binarizing the SEM image of FIG. 8. In a binarized image, a fine chemical crystal was formed at a white portion. As the fine chemical crystal is much, the phosphate treatability is high. According to this, the area ratio TR of a white portion was obtained by using the binarized image. In a case where the area ratio TR was 30% or greater, it was determined that the phosphate treatability was good. The area ratios TR of each Test Nos. are shown in Table 2. In the table "G" signifies GOOD, and "NG" signifies NO GOOD.

[Test Result]

Figure 10:
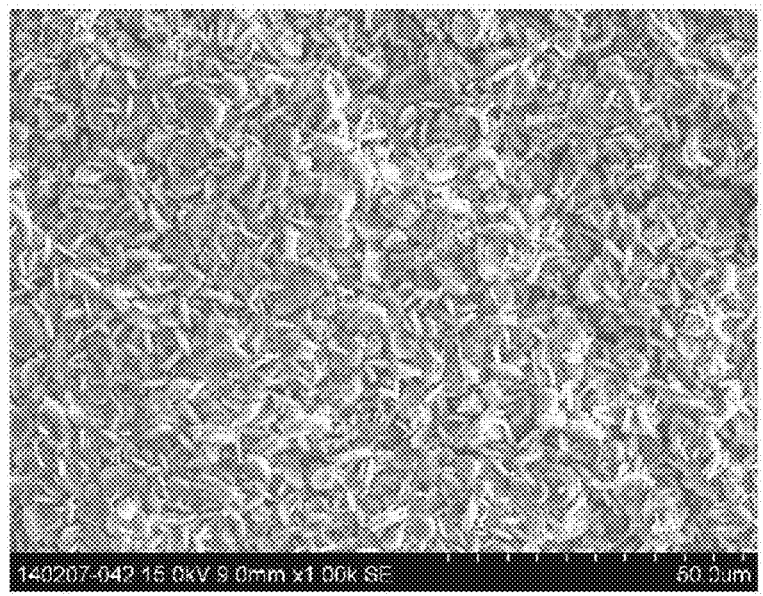
FIG. 10 is a SEM image of the surface of the steel of Examples in a case where hot-stamped steel tempered at 400° C. is subjected to phosphate treatment.
Figure 11:
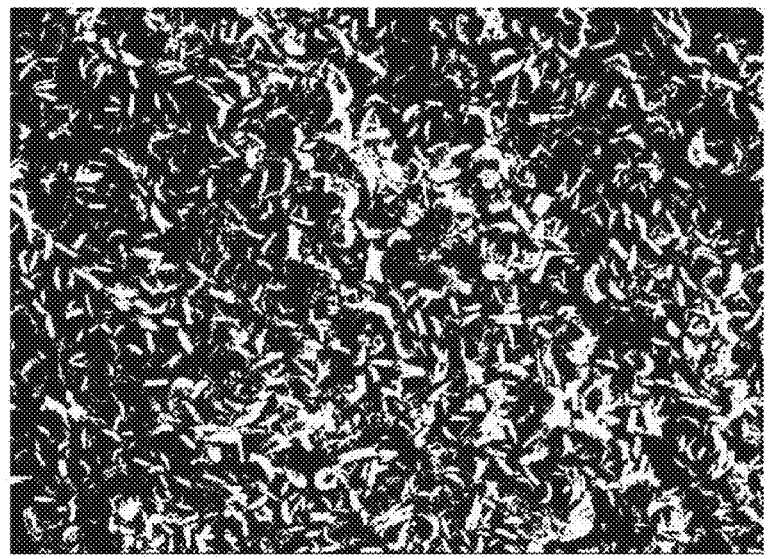
FIG. 11 is a binarized image of the SEM image of FIG. 10.
Figure 12:
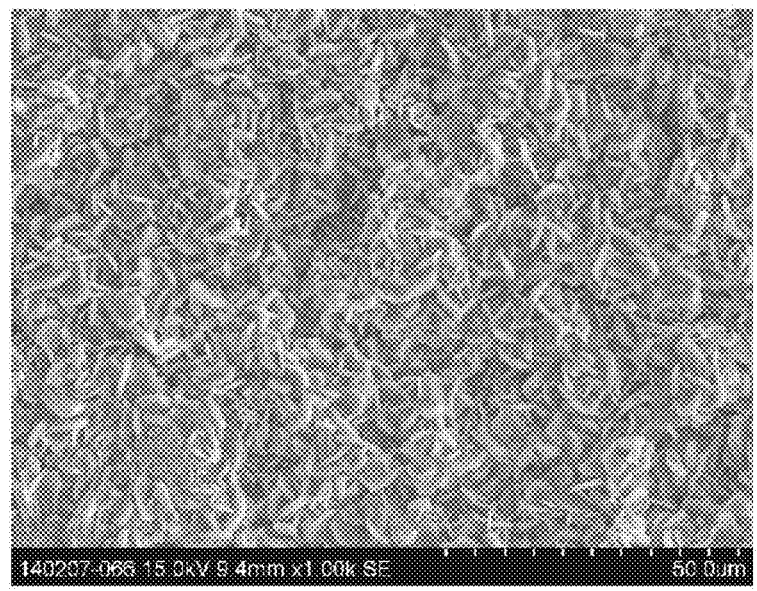
FIG. 12 is a SEM image of the surface of the steel of Examples in a case where hot-stamped steel tempered at 700° C. is subjected to phosphate treatment.
Figure 13:
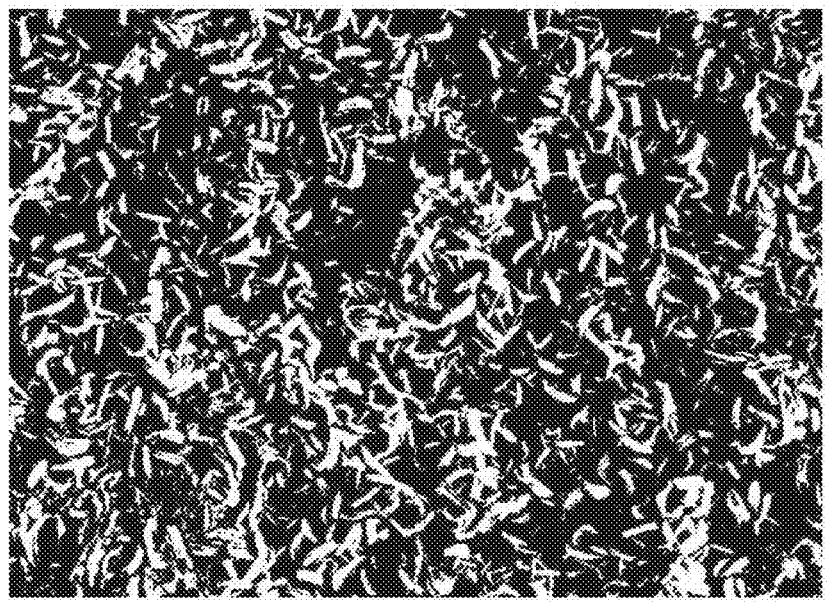
FIG. 13 is a binarized image of the SEM image of FIG. 12.

FIG. 10 is a SEM image (at magnification of 1000 times) of surface of the hot-stamped steel in which the phosphate treatment is performed with respect to the hot-stamped steel tempered at 400° C. (Test No. 10). FIG. 11 is an image obtained by binarizing the SEM image of FIG. 10. FIG. 12 is a SEM image (at a magnification of 1000 times) of surface of the hot-stamped steel in which the phosphate treatment was performed with respect to the hot-stamped steel tempered at 700° C. (Test No. 12). FIG. 13 is an image obtained by binarizing the SEM image of FIG. 12.

Referring to Table 2, the microstructure of the base metal of Test Nos. 1 to 8 which were subjected to tempering at 500 to 650° C. were tempered martensite, and the Vickers hardnesses thereof were 180 to 450 HV and 85% or less of the highest quenching hardness.

That is, the hardnesses of the hot-stamped steel of these Test Nos. were hardness corresponding to a strength of 1450 MPa or less. In addition, in these hot-stamped steel, the area ratio of the lamella layer in the Zn coating layer is 30% or more, and thus, the area ratios TR in the evaluation test for phosphate treatability were 30% or more. That is, the hot-stamped steel of Test Nos. 1 to 8 indicated excellent impact absorption properties and phosphate treatability.

On the other hand, in Test Nos. 9 to 13, the tempering temperatures were less than 500° C. or 700° C. or more. As a result, in the hot-stamped steel of Test Nos. 9 to 13, the area ratio of the lamella layer in the Zn coating layer was less than 30%. Accordingly, the area ratios TR in the evaluation test for phosphate treatability were less than 30% and phosphate treatability were low. In addition, in Test No. 9 since the tempering temperature was low, the hardness of the base metal was not 85% or less of the highest quenching hardness even after tempering Test No. 14 is an example which was not subjected to tempering. Therefore, the microstructure of the base metal was martensite (fresh martensite). Accordingly, the Vickers hardness was 450 HV or more and thus exceeds 85% of the highest quenching hardness. Moreover, the area ratio of the lamella layer in the Zn coating layer was less than 30% and the phosphate treatability was low Hereinbefore, the embodiment of the present invention has been described. However, the above-described embodiment is only illustrative examples of carrying-out the present invention. Accordingly, the present invention is not limited to the above-described embodiment, and the present invention can be carried out by appropriately modifying the above-described embodiment in a range not departing from the gist of the present invention.

BRIEF DESCRIPTION OF THE REFERENCE SYMBOLS

10: SOLID-SOLUTION LAYER
20: TEMPERED PORTION
30: ZINC OXIDE LAYER
40: LAMELLA LAYER

INDUSTRIAL APPLICABILITY

According to the present invention, it is possible to provide hot-stamped steel that has strength lower than those of hot-stamped steel having the same chemical composition in the related art, and includes a Zn coating layer excellent in phosphate treatability.

What is claimed is:

1. A hot-stamped steel comprising:
a base metal that is a steel sheet where a part of the steel sheet is a tempered portion or an entirely of the steel sheet is a tempered portion, said tempered portion having a hardness corresponding to 85% or less of the highest quenching hardness, the highest quenching hardness being defined as a Vickers hardness at a depth position spaced away from a surface layer by ¼ times a sheet thickness in a case of performing water quenching after heating to a temperature equal to or higher than an $A_{c3}$ point and retaining for 30 minutes; and
a Zn coating layer that is formed on the tempered portion of the base metal,
wherein the Zn coating layer includes
a solid-solution layer including a solid-solution phase that contains Fe and Zn that is solid-soluted in Fe, and
a lamella layer that includes the solid-solution phase and a capital gamma phase, and
wherein in the Zn coating layer, an area ratio of the lamella layer in a cross-section perpendicular to a rolling direction is 30 to 100% and an area ratio of the solid-solution layer is 0 to 70%.

2. The hot-stamped steel according to claim 1,
wherein the area ratio of the lamella layer in the Zn coating layer is 80% or more.

3. The hot-stamped steel according to claim 1 or 2,
wherein a Vickers hardness with a load of 10 kgf of the tempered portion is 180 Hv to 450 Hv.

4. The hot-stamped steel according to claim 1 or 2,
wherein a hardness of the tempered portion is 65% or less of the highest quenching hardness.

5. The hot-stamped steel according to claim 1 or 2,
wherein the hot-stamped steel is produced by heating to the $A_{c3}$ point or higher, working and quenching simultaneously through pressing by using a die, and then tempering at 500° C. or more and less than 700° C.

6. The hot-stamped steel according to claim 1 or 2,
wherein a part of the base metal is the tempered portion.

* * * * *